(12) United States Patent
Thomas et al.

(10) Patent No.: US 7,417,586 B2
(45) Date of Patent: Aug. 26, 2008

(54) METHODS AND SYSTEMS FOR INTERFEROMETRIC CROSS TRACK PHASE CALIBRATION

(75) Inventors: Steven H. Thomas, Brooklyn Center, MN (US); Larry D. Almsted, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/348,574

(22) Filed: Feb. 7, 2006

(65) Prior Publication Data

US 2008/0143585 A1 Jun. 19, 2008

(51) Int. Cl.
*G01S 7/40* (2006.01)
*G01S 13/08* (2006.01)
*G01S 13/00* (2006.01)
*G01C 5/00* (2006.01)

(52) U.S. Cl. ............... 342/174; 342/89; 342/118; 342/124; 342/147; 342/156; 342/165; 342/173; 342/175; 342/195

(58) Field of Classification Search ......... 342/61–65, 342/82–103, 118, 120–127, 165–175, 192–197, 342/59, 146, 147, 159–164, 156–158
See application file for complete search history.

(56) References Cited

U.S. PATENT DOCUMENTS

| 4,121,213 | A |  | 10/1978 | Bush et al. |
| 4,494,118 | A |  | 1/1985 | Graves |
| 4,683,473 | A |  | 7/1987 | Haugland |
| 4,719,465 | A |  | 1/1988 | Kuroda |
| 5,160,933 | A |  | 11/1992 | Hager |
| 5,260,708 | A | * | 11/1993 | Auterman ............ 342/59 |
| 5,477,226 | A |  | 12/1995 | Hager et al. |
| 5,736,957 | A |  | 4/1998 | Raney |
| 5,808,578 | A | * | 9/1998 | Barbella et al. ......... 342/62 |
| H1806 | H |  | 10/1999 | Ammons et al. |
| 6,100,841 | A |  | 8/2000 | Toth et al. |
| 6,144,333 | A | * | 11/2000 | Cho ................. 342/160 |
| 6,339,399 | B1 |  | 1/2002 | Andersson et al. |
| 6,362,776 | B1 |  | 3/2002 | Hager et al. |
| 6,650,280 | B2 | * | 11/2003 | Arndt et al. ........... 342/124 |
| 6,680,691 | B2 | * | 1/2004 | Hager et al. ........... 342/127 |
| 6,731,236 | B1 |  | 5/2004 | Hager et al. |
| 6,856,279 | B2 | * | 2/2005 | Hager et al. ........... 342/147 |
| 2005/0273257 | A1 |  | 12/2005 | Hager et al. |

OTHER PUBLICATIONS

European Search Report; May 14, 2007; 5 pages.

* cited by examiner

*Primary Examiner*—Bernarr E Gregory
(74) *Attorney, Agent, or Firm*—Fogg & Powers, LLC

(57) ABSTRACT

A method to compensate for variances in signal path delays for a plurality of radar return processing channels is described. The method comprises providing a signal in the signal path between an antenna and a corresponding receiver of each radar return processing channel, receiving a reflection of the provided signal from each antenna at the corresponding receiver, measuring phase variances between the reflected signals processed by each receiver, and adjusting compensation algorithms for each radar return processing channel based on the measured phase variances.

19 Claims, 8 Drawing Sheets

METHODS AND SYSTEMS FOR INTERFEROMETRIC CROSS TRACK PHASE CALIBRATION

BACKGROUND OF THE INVENTION

This invention relates generally to terrain aided navigation systems, and more specifically, to methods and systems for interferometric cross track phase calibration.

A precision terrain aided navigation (PTAN) system is an autonomous navigation aide that measures terrain features using radar and correlates those terrain features to stored digital terrain elevation data (DTED) to provide a precise air vehicle position. In operation, a PTAN Doppler interferometric radar system incorporates beam sharpening to measure cross track ranges. More specifically, the range to the highest terrain in the ground swath is measured as well as the angle from the air vehicle to the highest terrain point. With this data, a distance to a region of interest can be determined. One known PTAN system relies on multiple radar receiver channels and corresponding antennas which provides for reception of ground return signals and a determination of phase differences between the ground return signals received by each of the antennas.

To prevent ambiguous cross track range determinations because of the possibility that the ground return signals received by each of the antennas may include a phase shift of greater than 360 degrees, three receivers and antennas are used in one known PTAN system. The three antenna and receiver system provides a mechanism to assure that the phase difference determinations are unambiguous. Such a process is sometimes referred to as unwrapping of the phases.

With this PTAN system, cross track ranges can be calculated to various types of terrain very precisely. However, the PTAN system may also provide erroneous range and angle data if the signal delay through one channel varies relative to the signal delays through one or more of the other two channels. One known way to prevent or reduce such errors is a time consuming, complex, and costly calibration process that is conducted as part of a PTAN system testing process that is performed just before shipment of the PTAN system. However, this calibration process does not prevent or take into account variances in channel delays that might occur during field operation over time due to aging of the individual components utilized within the system, or due to environmental variances, such as temperature, that the PTAN system may encounter.

BRIEF SUMMARY OF THE INVENTION

In one aspect, a method to compensate for variances in signal path delays for a plurality of radar return processing channels is provided. The method comprises providing a signal in the signal path between an antenna and a corresponding receiver of each radar return processing channel, receiving a reflection of the provided signal from each antenna at the corresponding receiver, measuring phase variances between the reflected signals processed by each receiver, and adjusting compensation algorithms for each radar return processing channel based on the measured phase variances.

In another aspect, a radar altimeter is provided that comprises a system processor, a plurality of receive antennas, a plurality of receive channels connected to corresponding receive antennas, and a signal source that is periodically switched to couplers located between the receive antennas and the corresponding receive channels. The receive channels are configured to output processed signals, originating from receptions at the antennas, to the processor. The antennas reflect signals from the signal source back toward the receivers and the processor is configured to determine phase variances between the reflected signals processed by each receiver and adjust compensation algorithms for each receive channel based on the measured phase variances.

In still another aspect, a radar processor is provided that comprises a plurality of phase detectors and a processing device. Each phase detector is configured to determine a phase difference between each antenna/receiver channel from a radar ground return signal. The processing device is programmed to determine a cross track distance to a region of interest (i.e. the highest terrain point within the cross track area) from which the radar ground return signals were reflected based on phase differences received from the phase detectors. The processing device is further programmed to adjust the determined cross track distance based on phase differences previously received from the phase detectors where the previously received phase differences are indicative of signal delay variations between receive antennas and respective phase detectors that are based on a calibration signal reflected from the receive antennas.

In yet another aspect, a radar receiver is provided that comprises a plurality of receive channels comprising corresponding receive antennas, a plurality of phase detectors, a signal source switchably coupled to each of the receive channels, and a processor. The receive channels are configured to output processed signals corresponding to receptions at the antennas and each phase detector is configured to determine a phase difference between processed signals received from a different pair of the receive channels. A signal from the signal source is configured to reflect from the antennas back through the receive channels and the processor is configured to utilize phase differences resulting from the reflected signals to adjust results of subsequent phase difference determinations, the phase differences resulting from the reflected signals indicative of a signal delay variation between the receive antennas and the phase detector.

DETAILED DESCRIPTION OF THE INVENTION

Methods and systems are described herein which reduce the reliance on the above described production calibration process and assure continued accurate operational performance regardless of time-based or environmentally-based changes experienced by an operational precision terrain aided navigation (PTAN) system.

Figure 1:
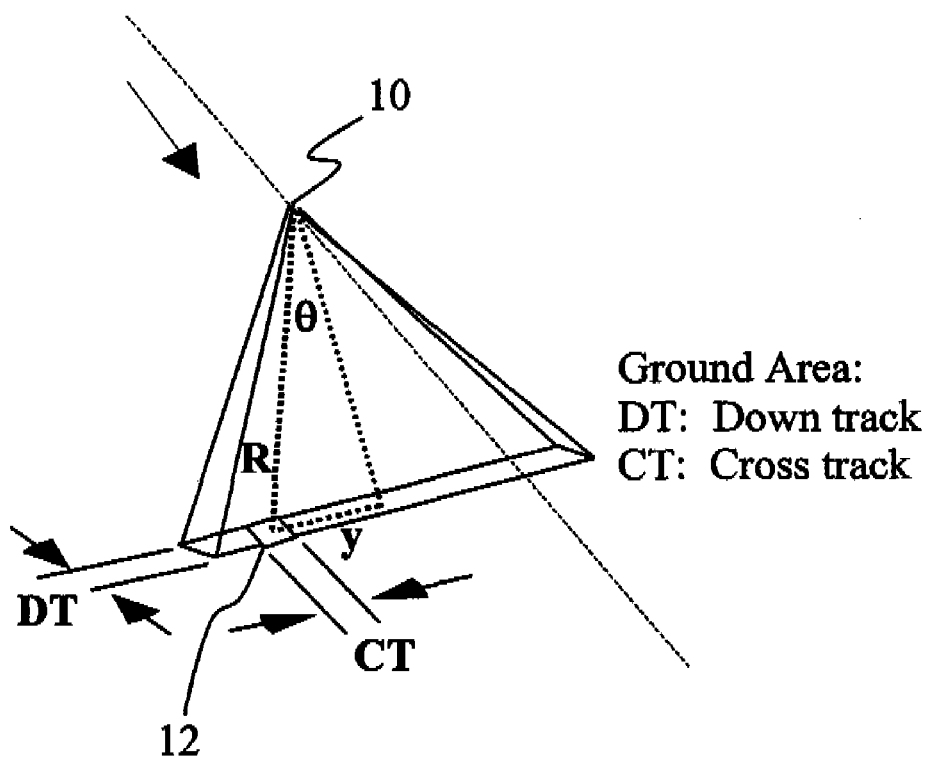
FIG. 1 is an illustration of the measurement of cross track ranges.

FIG. 1 is an illustration of Doppler beam sharpening within an airborne PTAN interferometric radar system 10. Doppler beam sharpening is a portion of the processing performed within radar system 10 that provides for accurate measurement of cross track ranges. More specifically, PTAN system 10 measures the range, R, to the highest terrain in the ground swath as well as the angle, θ, to this highest point. Using R and θ, the distance, y, to the region of interest can be determined.

Figure 2:
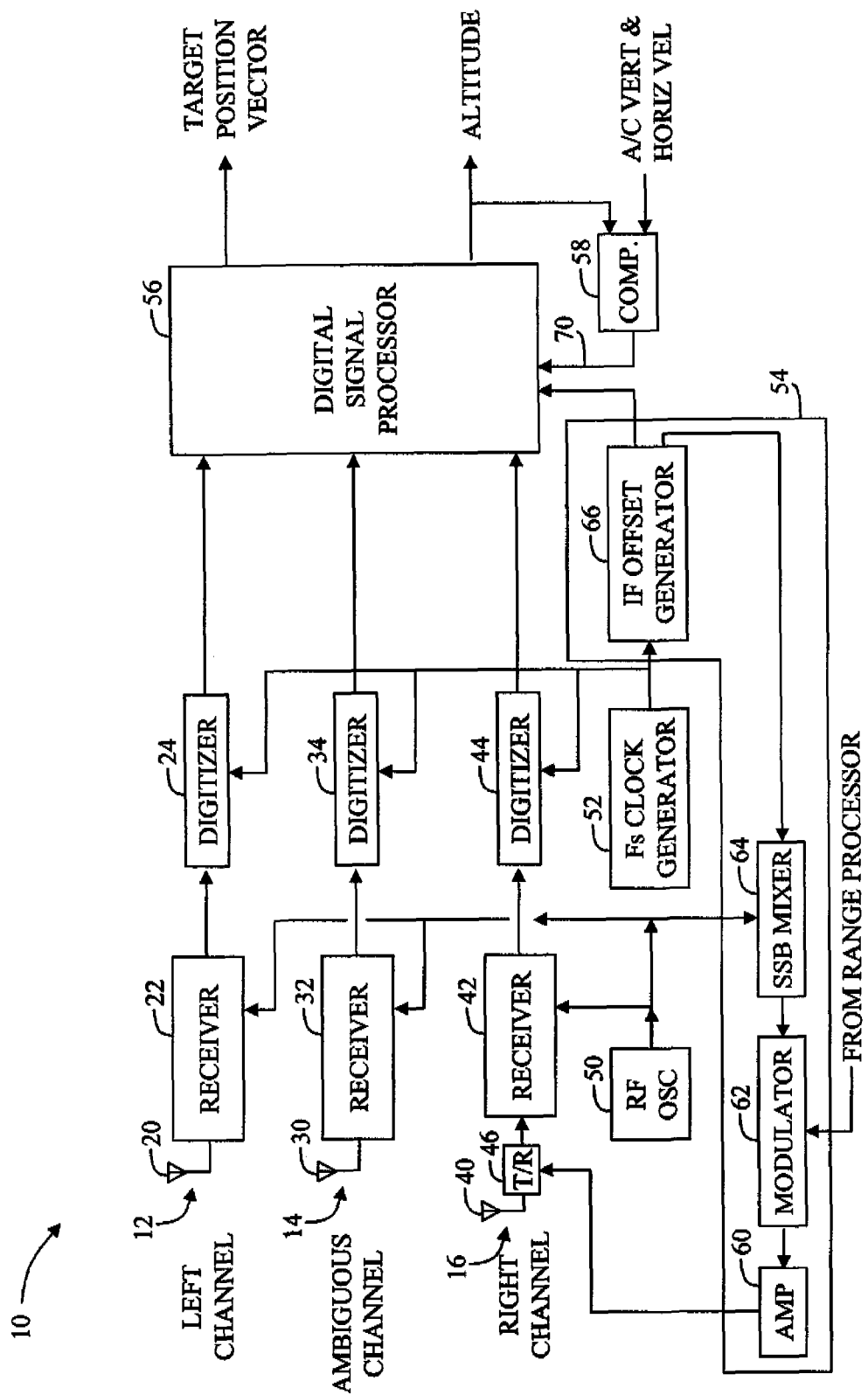
FIG. 2 is a block diagram of a precision terrain aided navigation (PTAN) system capable of measurement of cross track ranges.

FIG. 2 is a block diagram of one embodiment of a three antenna, three channel, PTAN radar altimeter 10. As described above, in one embodiment, radar altimeter 10 is incorporated in an air vehicle. Radar altimeter 10 includes three channels—a left channel 12, an ambiguous channel 14, and a right channel 16. Left channel 12 includes antenna 20, receiver 22 and digitizer 24. Ambiguous channel 14 includes antenna 30, receiver 32 and digitizer 34. Right channel 16 includes antenna 40, receiver 42, digitizer 44, and transmit/receive switch 46. Transmit/receive switch 46 allows right channel 16 to operate in either a transmit mode or a receive mode. In other embodiments, transmit/receive switch 46 may be incorporated as part of either left channel 12 or ambiguous channel 14. By referring to channel 14 as ambiguous, it is to be understood that the position of antenna 30 of ambiguous channel 14 is unequally spaced somewhere between the antenna 20 of left channel 12 and the antenna 40 of right channel 16.

Radar altimeter 10 further includes RF oscillator 50, clock generator 52, transmitter 54, digital signal processor (DSP) 56 and computer 58. Transmitter 54 includes power amplifier 60, modulator 62, single side band (SSB) mixer 64 and intermediate frequency (IF) offset generator 66. RF oscillator 50 is coupled to mixers within receivers 22, 32, and 42 and SSB mixer 64. Clock generator 52 is coupled to digitizers 24, 34, and 44 and IF offset generator 66.

Radar altimeter 10 provides cross track and vertical distance to the highest object below the air vehicle in, for example, ten foot wide down-track swaths, which are bounded by an antenna pattern having a width in the cross-track direction as shown in FIG. 1. As used herein, "down track" means in the direction of travel and "cross track" means perpendicular to the direction of travel. Other antenna patterns and swath characteristics may be used. The down track width of a swath varies with the altitude of the air vehicle.

In operation, radar altimeter 10, via transmitter 54, transmit/receive switch 46, and antenna 40, transmits a pulse modulated radar signal toward the ground. The signal reflected from the ground is received by antennas 20, 30, and 40 and is processed by the corresponding receivers 22, 32, and 42. As receivers 22, 32, and 42 are equivalent, operation is described with respect to receiver 42 only. The return signal received by antenna 40 passes through transmit/receive switch 46 and input into receiver 42 where it is amplified, mixed down to an intermediate frequency, amplified again and output to digitizer 44. Digitizer 44 digitizes the received signal and outputs the digitized signal to DSP 56. The frequency of clock generator 52 determines the rate that the incoming analog signals (radar ground return signals) received and processed by channels 12, 14, and 16 are sampled and digitized by digitizers 24, 34, and 44.

Computer 58 receives air vehicle or aircraft (A/C) vertical and horizontal velocity data from the air vehicle's inertial navigation system (INS). Computer 58 processes the velocity data and outputs control signals to DSP 56 on control lines 70. DSP 56 outputs target position vectors identifying the position of the highest point within particular regions or "swaths" on the ground, and also outputs above ground level (AGL) altitude data that identifies the vehicle altitude.

Radar altimeter 10 relies on multiple receiver channels (i.e., channels 12, 14, and 16) and their corresponding antennas 20, 30, and 40 to determine, within DSP 56, phase differences between the received ground return signals. To prevent ambiguous cross track ranges because of greater than 360 degree phase shifts in the signals received at the respective antennas, sometimes referred to as "phase-wrapping", the above described three receiver and three antenna system is used. Processing of signals received through three separate channels provides a mechanism to assure that the determined phase differences between the three separately received and processed ground return signals are unambiguous as further described below.

Figure 3:
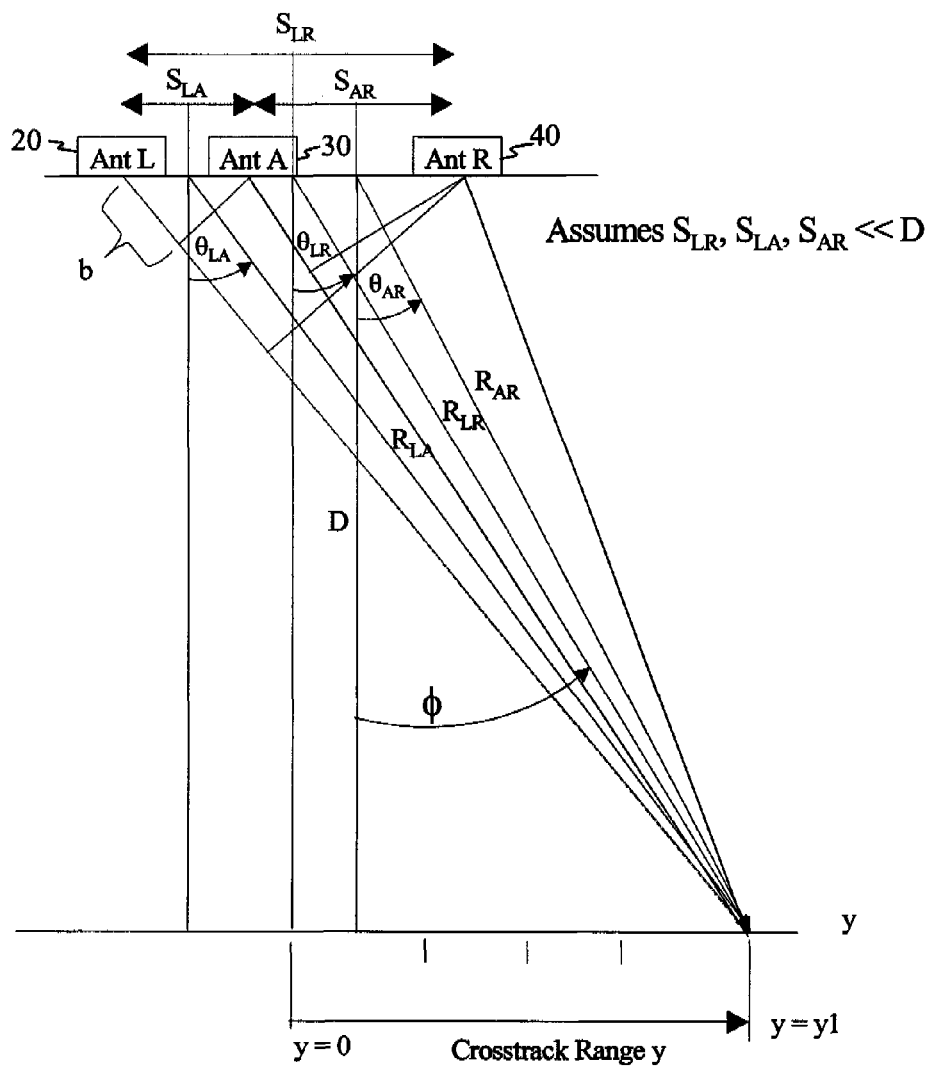
FIG. 3 illustrates one placement embodiment for the three antennas of the radar altimeter of FIG. 2.

The differential phase measurements performed by radar altimeter 10 are precise in order to achieve the desired accuracy in the range and distance measurements. FIG. 3 is an illustration of one placement of the three antennas 20, 30, and 40 for radar altimeter 10. Referring to FIG. 3, when the distance b is greater than one wavelength, which is a function of one or more of the operational frequency of radar altimeter 10, the distances between antennas 20, 30, and 40, and the angles, θ, then the actual relative phases of the ground returns received by the antennas can be determined.

With the above described three channel system (e.g., radar altimeter 10), cross track ranges can be calculated to various types of terrain very precisely. However, data output from radar altimeter 10 will include errors if the signal delay through one receiver channel varies relative to one or both of the other two receiver channels. In one known calibration scenario, a time consuming, complex, and costly calibration process may be conducted as part of the testing process just before shipment. However, this calibration process does not prevent channel delays from varying during field operation. Channel delay variance may be caused by, for example, changes in the travel time of received radar return signals through the individual receiver channels based, for example, on an aging of the components used within the receiver channels. Environmental changes, such as changes in temperature, may also contribute to changes in the signal travel times through the individual receiver channels 12, 14, and 16.

Figure 4:
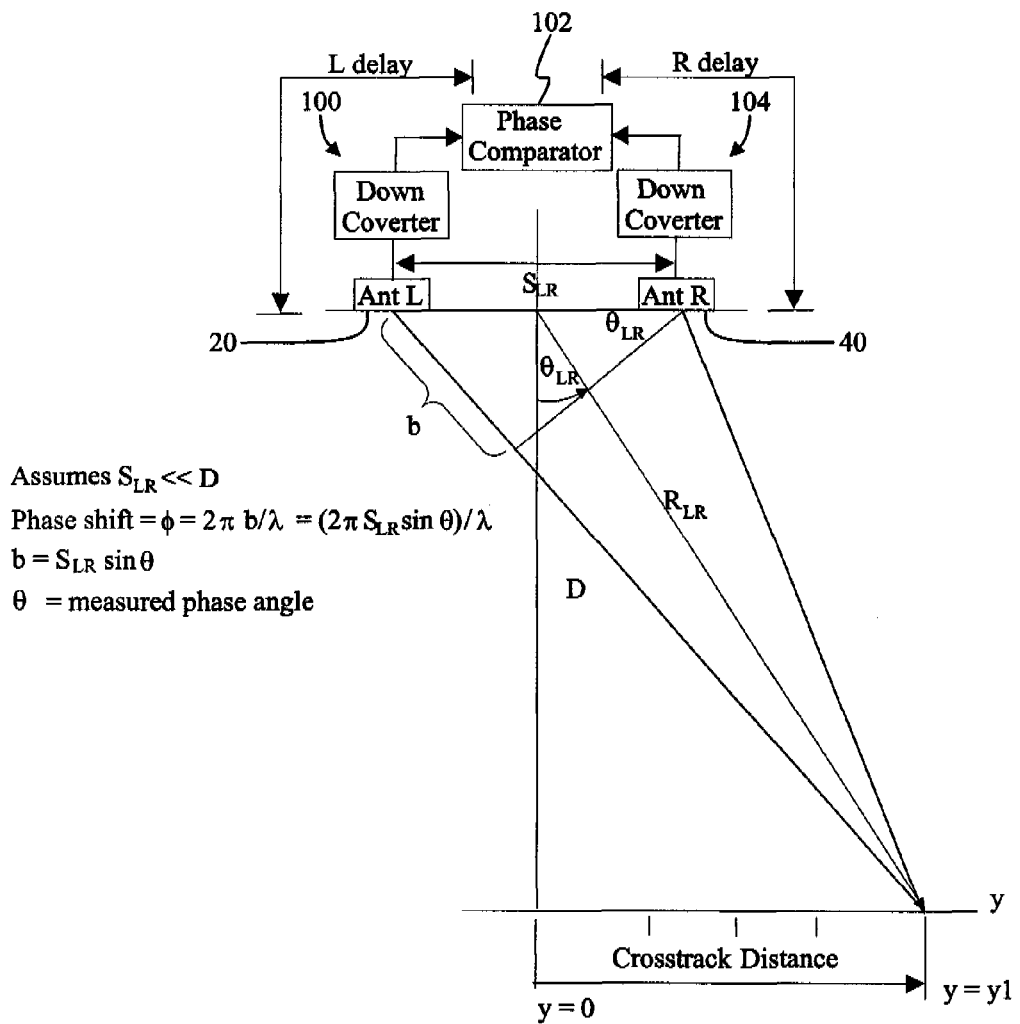
FIG. 4 illustrates several processing paths for signals received by the PTAN system of FIG. 2.

FIG. 4 illustrates the processing paths for signals received by, for example, a PTAN system such as radar altimeter 10. For simplicity, only two of the processing paths are illustrated. Processing path 100 represents the signal path from left antenna 20 to a phase comparator 102 programmed within DSP 56 (shown in FIG. 2). Processing path 104 represents the signal path from right antenna 14 to the phase comparator 102. Time delays occurring within signal paths 100 and 104 (or within a signal path associated with ambiguous channel 14 (shown in FIG. 2)) are addressed when processing radar ground return signals within the DSP 56 because the time delays are embodied as additions or subtractions to the phase shift being calculating between the ground returns received by left antenna 20, ambiguous antenna 30, and right antenna 40. If processing paths 100 and 104 are stable and are known quantities, then these signal paths can be compensated for within processor algorithms. However, if delays in any of the signal processing paths of radar altimeter 10 vary because of signal routing changes, component aging, or environment (such as temperature), as described above, then errors in the determination of the phase difference between the received ground returns may increase.

This problem is further illustrated through a numerical example. At a 4.3 GHz radar altimeter transmission frequency, a wavelength of the transmitted (and received) signals is 0.2291 feet. Within this wavelength, the phase between received signals at the various antennas 20, 30, and 40 may vary from 0 to 360 degrees. Range or distance in free space can be determined based on the velocity of the signal which travels at the speed of light. For a radar system where the signal propagates to the ground and back, the distance, d, is determined according to $d=c \times t/2$. At 0.1 nanosecond, the distance $d=c \times t/2=0.98357 \times 10^9$ feet/sec $\times 0.05 \times 10^{-9}$ sec=0.0492 feet. Therefore, if there is a change of 0.1 nanosecond in the path delay of processing path 100, for example, a change in phase of $0.0492/0.2291 \times 360$ degrees=77.31 degrees will result.

Figure 5:
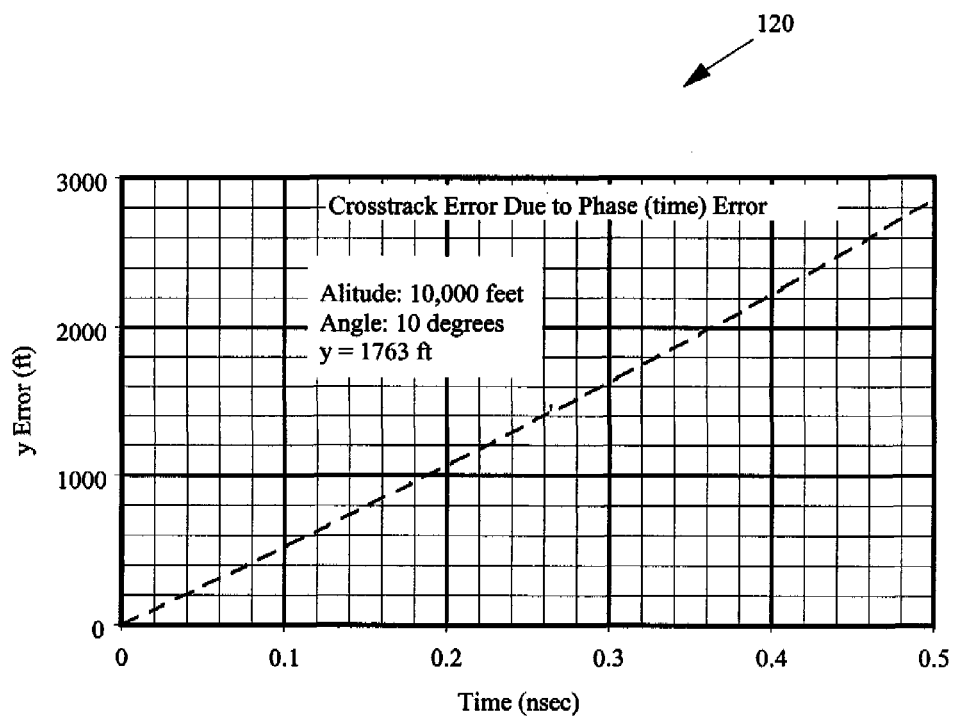
FIG. 5 is a graph illustrating cross track error as a function of variations in signal path delay.

The above described variation in a signal path delay can result in a significant error in a cross track distance determination as illustrated in FIG. 5. At an altitude of 10,000 feet and an angle of 10 degrees, for example, the cross track true distance y is 1763 ft. FIG. 5 is a graph 120 illustrating cross track error as a function of variations in a signal path delay time, for example, a variation of processing path 100 and/or 104 (shown in FIG. 3). For example, if the signal delay through processing path 100 varies by 0.1 nanosecond, the cross track error, $y_e$, is 531 feet. Therefore, the cross track distance that would be indicated due to the 0.1 nanosecond change in signal path time is $y_1=y+y_e=1763$ ft+531 ft=2294 ft.

Figure 6:
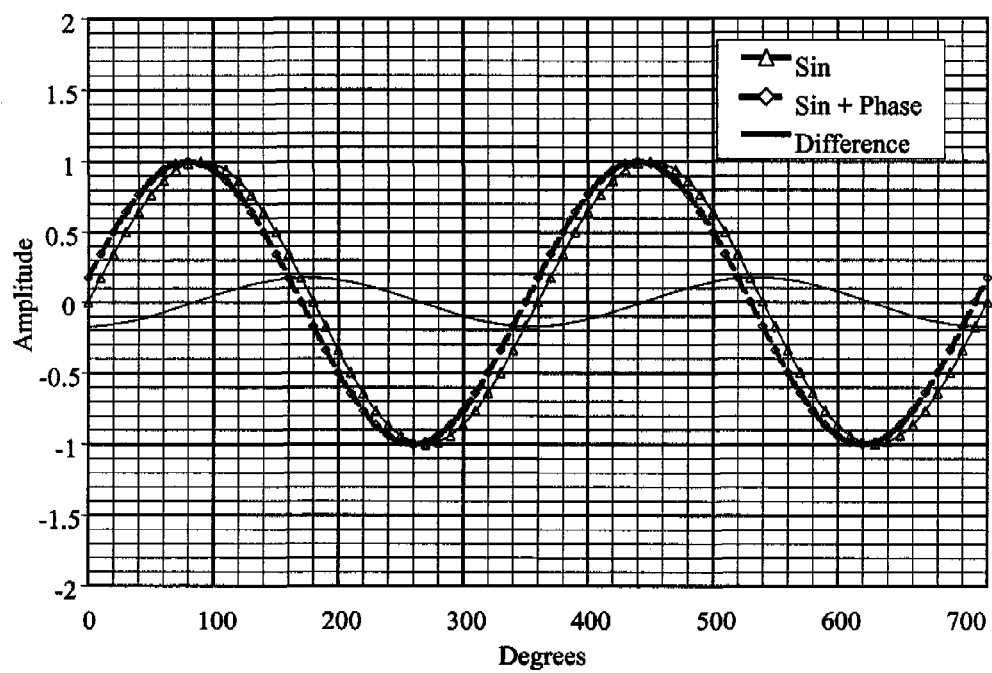
FIG. 6 is an illustration of phase difference between two signals caused by a slight variation in the signal path delay of one of the signals.

It is more difficult to measure a time delay of 0.1 nanosecond or less in a signal than it is to measure a phase change of the signal. Phase comparators have the capability of measuring less than 0.1 degree phase shift. FIG. 6 is an illustration of the phase difference between two signals caused by a 0.1 nanosecond variation in time of one of the signals. If a single test signal is applied to each radar channel of radar altimeter 10, then any phase differences caused by signal delays in any one of the three radar return channels can be detected and integrated. The result of such an operation can be utilized to provide compensation in one or more of the radar return channels, to calibrate out of the system errors caused by signal delay variations.

Figure 7:
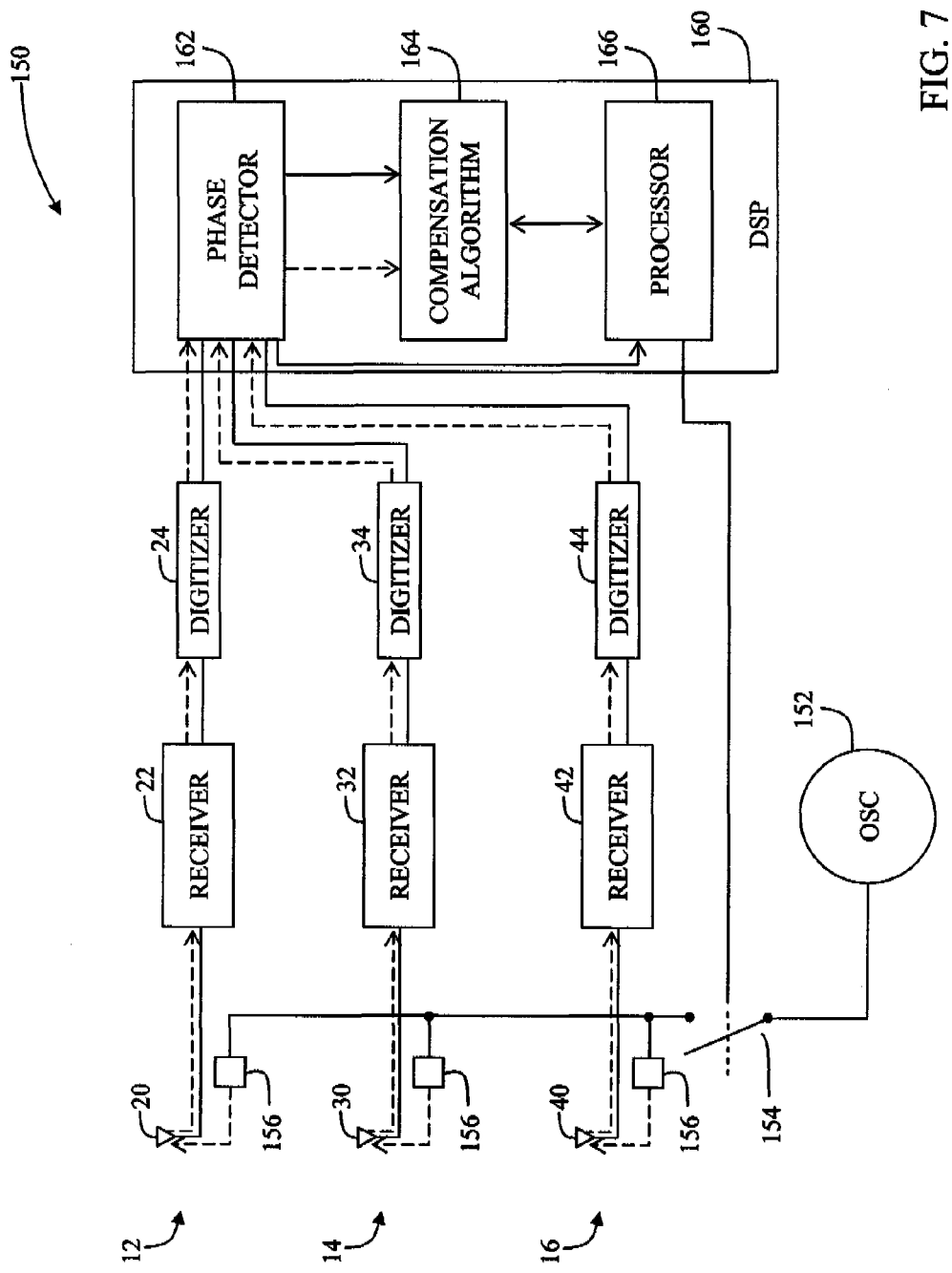
FIG. 7 is a block diagram of a radar altimeter receiver that incorporates a calibration mechanization.

FIG. 7 is a block diagram of the receiver portion 150 of a three channel radar altimeter which incorporates a calibration mechanization that includes an oscillator 152, a switch 154, and a plurality of coupling devices 156. Components of receiver portion 150 that are common with components of radar altimeter 10 (shown in FIG. 2) are illustrated in FIG. 7 using the same reference numerals. When switch 154 is closed momentarily, an output of oscillator 152 is coupled into each radar channel (e.g., radar channels 12, 14, and 16) at substantially the same time via coupling device 156. The oscillator output signal from coupling devices 156 travels through the radio frequency (RF) cabling that interconnects each receiver 22, 32, and 42, to its respective antenna 20, 30, and 40. The antennas 20, 30, and 40 will reflect a portion of the RF energy in the oscillator output signal due to the small mismatch in impedance of the antenna as compared to the impedance of the circuit to which it is attached. This impedance mismatch is always present because the antenna RF impedance differs from the RF cable impedance. Because receivers 22, 32, and 42 are very sensitive (i.e. less than –120 dBm sensitivity), only a very small amount of reflected signal is needed to be effectively processed by these receivers.

The reflected signals are down converted in receivers 22, 32, and 42, and digitized by respective digitizers 24, 34, and 44. Outputs of digitizers 24, 34, and 44 are received by DSP 160 which includes phase detectors 162 and a compensation algorithm 164 therein. It is understood that discrete phase processors and other processing components could be utilized in place of DSP 160. Phase detectors 162 calculate the phase differences between the various "pairs" of reflected signals processed through the processing channels 12, 14, and 16. The resulting signals, which include the phase differences as perceived by the receiving channels, are used by a processor 166 within DSP 160 to generate the compensation algorithm 164 for utilization by processor 166. Compensation algorithm 164 includes data allowing processor 166 to adjust measured phase differences in ground return signals based on the phase differences found in the calibration signals that had been previously reflected from antennas 20, 30, and 40 and processed within receiver portion 150. In one embodiment and as illustrated, processor 166 is further programmed to control operation of switch 154, allowing for the calibration signal from oscillator 152 to be input into receiver channels 12, 14, and 16 periodically.

The above described approach provides a methodology for calibrating out variations in the signal delay paths through the separate receiver channels of the radar altimeter system. Further provided is a mechanism that allows for periodic checking for variances in signal travel times through the receiver channels due to environmental conditions. If variances in the signal travel times occur, then they are compensated for within system processor 166, thereby providing for the necessary accuracy required during all parts of the flight mission.

Figure 8:
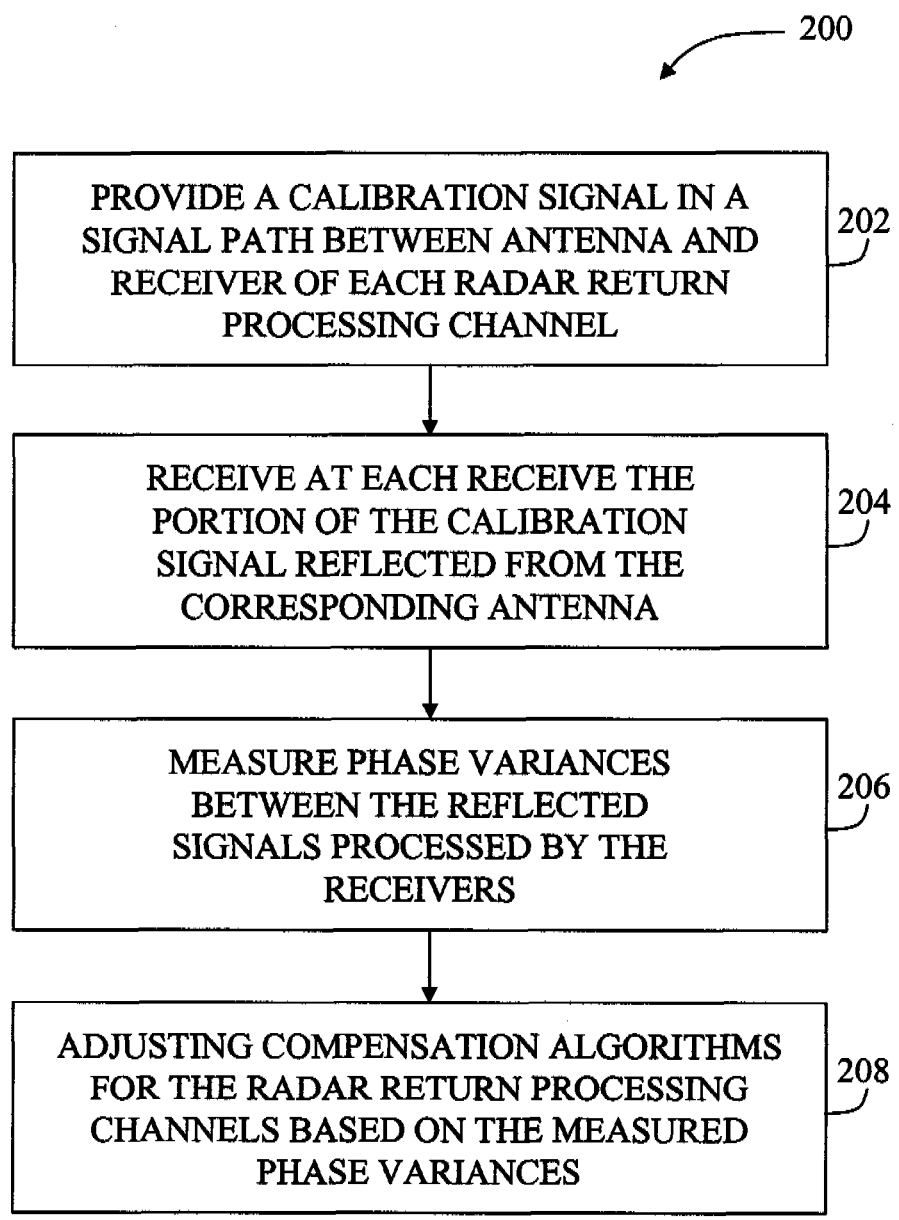
FIG. 8 is a flow chart illustrating a process performed by the radar altimeter receiver of FIG. 7.

FIG. 8 is a flowchart 200 that further illustrates a method performed by receiver portion 150 of a radar altimeter (shown in FIG. 7). More specifically, FIG. 8 illustrates a method for compensating for variances in time delays between a plurality of radar return processing channels. This method includes providing 202 a signal in the signal path between an antenna and a corresponding receiver of each radar return processing channel. By providing 202 this signal, a reflection of the provided signal from each antenna is received 204 at the corresponding receiver. Phase variances between the reflected signals processed by each receiver are measured 206 and compensation algorithms for each radar return processing channel are adjusted 208 based on the measured phase variances.

The above described methods and systems provide for a calibration mode of operation in a radar altimeter system that compensates for signal delay variances through radar return processing channels and the resulting phase shift errors. The methods are capable of being conducted periodically as a background calibration during operation of the radar altimeter which enables precise calibration during flight, and more importantly as the air vehicle operates in a mapped area with recorded DTED and prepares to reconcile radar altimeter data with the stored DTED data.

While the invention has been described in terms of various specific embodiments, those skilled in the art will recognize that the invention can be practiced with modification within the spirit and scope of the claims.

What is claimed is:

1. A method to compensate for variances in signal path delays for a plurality of radar return processing channels, said method comprising:

providing a signal in the signal path between an antenna and a corresponding receiver of each radar return processing channel, wherein providing the signal in the signal path comprises momentarily switching an output of a signal source into each radar return processing channel;

receiving a reflection of the provided signal from each antenna at the corresponding receiver;

measuring phase variances between the reflected signals processed by each receiver; and adjusting compensation algorithms for each radar return processing channel based on the measured phase variances.

2. A method according to claim 1 wherein the signal source comprises an oscillator.

3. A method according to claim 1 wherein switching an output of the signal source into each radar return processing channel comprises applying the output of the oscillator to each radar return processing channel substantially simultaneously.

4. A method according to claim 1 wherein switching an output of the signal source into each radar return processing channel comprises periodically applying the output of the oscillator to each radar return processing channel.

5. A method according to claim 1 wherein receiving a reflection of the provided signal comprises:

down converting the received signal to an intermediate frequency; and digitizing the intermediate frequency signal.

6. A method according to claim 1 wherein measuring phase variances between the reflected signals comprises determining a signal path delay between the antenna and the corresponding receiver for each radar return processing channel.

7. A method according to claim 1 wherein adjusting compensation algorithms for each radar return processing channel comprises compensating a calculated cross track distance to a region of interest based on the variations of measured phase between radar return processing channels.

8. A radar altimeter comprising:

a system processor;

a plurality of receive antennas;

a plurality of receivers;

a plurality of receive channels coupled to corresponding said receive antennas and said receivers, said receive channels configured to output processed signals, originating from receptions at said antennas, to said processor; and a signal source switchably coupled to the couplings between said receive antennas and corresponding said receive channels, said antennas thereby reflecting signals from said signal source back toward said receivers, said processor configured to measure phase variances between the reflected signals processed by each said receiver and adjust compensation algorithms programmed therein for each said receive channel based on the measured phase variances.

9. A radar altimeter according to claim 8 wherein said signal source comprises an oscillator configured to be momentarily switched into each said receive channel.

10. A radar altimeter according to claim 9 further comprising a switch configured to couple said oscillator to each said receive channel substantially simultaneously.

11. A radar altimeter according to claim 9 further comprising a switch configured to couple said oscillator to each said receive channel, said processor programmed to periodically apply the output of said oscillator to each said receive channel.

12. A radar altimeter according to claim 8 wherein said processor comprises at least one phase detector, said processor configured to utilize the measured phase variances between the reflected signals to determine a signal path delay between each said receive antenna and said phase detector.

13. A radar altimeter according to claim 12 wherein to adjust the compensation algorithms said processor is configured to compensate a calculated cross track distance to a region of interest based on variations of phase between signals received at said phase detector.

14. A radar receiver comprising:

a plurality of receive channels comprising corresponding receive antennas, said receive channels configured to output processed signals corresponding to receptions at said antennas;

a plurality of phase detectors, each said phase detector configured to determine a phase difference between processed signals received from a different pair of said receive channels;

a signal source switchably coupled to each of said receive channels, a signal from said signal source configured to reflect from said antennas through said receive channels; and a processor configured to utilize phase differences resulting from the reflected signals to adjust results of subsequent phase difference determinations, the phase differences resulting from the reflected signals indicative of signal delay times between said receive antennas and said phase detectors.

15. A radar receiver according to claim 14 wherein said processor is configured to periodically couple said signal source to each of said receive channels.

16. A radar receiver according to claim 15 further comprising a switch, said switch configured to couple said signal source to each of said receive channels, said processor configured to control operation of said switch.

17. A radar receiver according to claim 14 wherein to adjust results of subsequent phase difference determinations, said processor is configured to adjust a cross track distance determination based on the phase differences resulting from the reflected signals.

18. A radar receiver according to claim 14 wherein said plurality of receive channels comprises three receive channels, said phase detectors configured to determine a phase difference between each of three separate pairings of said three receive channels.

19. A radar receiver according to claim 14 wherein said signal source comprises an oscillator.

* * * * *